United States Patent
Uozumi et al.

(10) Patent No.: US 7,999,561 B2
(45) Date of Patent: Aug. 16, 2011

(54) RESIN IMPREGNATED AMOUNT MEASURING METHOD AND RESIN IMPREGNATED AMOUNT MEASURING DEVICE IN FILAMENT WINDING MOLDING

(75) Inventors: Tadashi Uozumi, Kyoto (JP); Motohiro Tanigawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 446 days.

(21) Appl. No.: 12/246,312

(22) Filed: Oct. 6, 2008

(65) Prior Publication Data

US 2009/0121728 A1 May 14, 2009

(30) Foreign Application Priority Data

Nov. 14, 2007 (JP) ................. 2007-296143

(51) Int. Cl.
*G01R 27/26* (2006.01)
(52) U.S. Cl. ...................... 324/658; 324/686
(58) Field of Classification Search ............ 324/658, 324/649, 600, 555, 519, 750.17, 686; 702/47, 702/52, 1, 108, 127
See application file for complete search history.

(56) References Cited

U.S. PATENT DOCUMENTS

| 3,951,321 A | 4/1976 | Heusser |
| 4,659,424 A | 4/1987 | Baxter et al. |
| 5,003,918 A | 4/1991 | Olson et al. |
| 5,266,139 A | 11/1993 | Yokota et al. |
| 6,510,358 B1 * | 1/2003 | Schattauer et al. ........ 700/117 |

FOREIGN PATENT DOCUMENTS

| EP | 1808690 A1 | 7/2007 |
| JP | 57013951 A | 1/1982 |
| JP | 6037754 U | 5/1994 |
| JP | 11320660 A | 11/1999 |
| JP | 2004-209923 | 7/2004 |
| JP | 2007185930 A | 7/2007 |

OTHER PUBLICATIONS

European search report for corresponding European application 08017653.0-2307 lists the references above.
Japanese language office action and its English language translation for corresponding Japanese application 2007296143 lists the references above.

* cited by examiner

*Primary Examiner* — Hoai-An D Nguyen
(74) *Attorney, Agent, or Firm* — DLA Piper LLP (US)

(57) ABSTRACT

A resin impregnated amount measuring method and device for accurately and successively measuring an amount of resin impregnated in a fiber in a filament winding molding. An electrostatic capacitance of a fiber impregnated with resin is measured, and an amount of resin impregnated in the fiber is measured based on the measurement result. The fiber impregnated with resin is traveled in a non-contacting manner between two parallel flat plates of an electrostatic capacitance sensor and a change in electrostatic capacitance is measured. The amount of resin impregnated in the fiber may also be measured by irradiating light on the impregnated fiber to determine the image area of, reflectivity of, or distance of the light source from, the fiber.

4 Claims, 8 Drawing Sheets

RESIN IMPREGNATED AMOUNT MEASURING METHOD AND RESIN IMPREGNATED AMOUNT MEASURING DEVICE IN FILAMENT WINDING MOLDING

CROSS-REFERENCE TO RELATED APPLICATIONS

This application claims the benefit of priority under 35 USC 119 of Japanese patent application no. 2007-296143, filed on Nov. 14, 2007, which is incorporated herein by reference.

BACKGROUND OF THE INVENTION

1. Field of the Invention

The present invention relates to a resin amount measuring method and device that measures an amount of resin impregnated in a fiber in a filament winding molding.

2. Description of the Related Art

A filament winding apparatus is configured by a fiber supply unit, a resin impregnating unit that impregnates resin in the fiber, a winding unit that winds the fiber to a member to be wound, and the like. It is known to arrange a device that measures the resin impregnated amount with respect to the fiber between the resin impregnating unit and the winding unit, and to feedback the measurement result to the resin impregnating unit, as is described in Japanese Laid-Open Patent Publication No. 2004-209923 and the like. Here, the weight of a predetermined length of the fiber after the resin impregnating unit is measured, and the resin impregnated amount is measured based on the measurement result. Specifically, a fiber of a predetermined length is pulled out from the resin impregnating unit, and the weight thereof is measured with both ends of the fiber in a supported state.

A filament winding molded article with satisfactory quality can be stably obtained while maintaining the resin impregnated amount with respect to the fiber in a predetermined constant range by feedback controlling the resin impregnating unit as described above. Production of defective goods can be suppressed since impregnation failure is detected before winding the fiber to the member to be wound.

However, in the mode of Japanese Laid-Open Patent Publication No. 2004-209923, the fiber needs to be gripped to measure the weight, and thus it is difficult to continuously perform the measurement without stopping the flow of fiber, and higher speed of the filament winding molding cannot be responded. Furthermore, since a gripping member and a load measuring instrument of the weight measuring unit contact the fiber, the resin transfers to the gripping member and the like, whereby the resin content may vary.

In addition, taking into consideration that it is extremely difficult to constantly support both ends of the fiber with a constant force, and that the amount of resin impregnated in the fiber in this type of filament winding molding is an extremely small amount of about 0.5 g/m, a slight error in the supporting force greatly influences the measurement value of the resin impregnated amount, and it is practically impossible to accurately measure the resin content. Since the impregnated amount of resin is an extremely small amount, the weight of the fiber of a length of a certain extent needs to be measured, and the amount of resin measuring device may enlarge.

SUMMARY OF THE INVENTION

It is an object of the present invention to provide a resin impregnated amount measuring method and a device thereof that accurately and continuously measures the resin impregnated amount with respect to the fiber in the filament winding molding in which the resin impregnating unit is feedback controlled.

A resin impregnated amount measuring method according to the present invention measures an electrostatic capacitance of a fiber impregnated with resin, and measures an amount of resin impregnated in the fiber based on a measurement result. Specifically, the amount of resin impregnated in the fiber is successively measured by traveling the fiber impregnated with resin in a non-contacting manner between two parallel flat plates configuring an electrostatic capacitance sensor and measuring the change in an electrostatic capacitance.

Another resin impregnated amount measuring method according to the present invention measures an amount of resin impregnated in a fiber by photoelectrically measuring a thickness of the fiber impregnated with resin. Specifically, a light projecting element irradiates the fiber impregnated with resin with light from a width direction of the fiber; and a light receiving element, arranged at an opposing position with the light projecting element with the fiber in between, images an image corresponding to a surface shape of the fiber impregnated with resin; and the amount of resin impregnated in the fiber is measured based on an area of the image obtained in the light receiving element.

Another resin impregnated amount measuring method of the present invention irradiates a resin impregnating surface of a fiber with light, and measures an amount of resin impregnated in the fiber based on a reflectivity.

A resin impregnated amount measuring device according to the present invention includes an electrostatic capacitance sensor having two parallel flat plates; and a traveling device for traveling the fiber impregnated with resin in a non-contacting manner between the two parallel flat plates; wherein the amount of resin impregnated in the fiber is successively measured while traveling the fiber with the traveling device.

Another resin impregnated amount measuring device of the present invention includes a light projecting element for irradiating the fiber impregnated with resin with light from a width direction of the fiber; a light receiving element, arranged at an opposing position with the light projecting element with the fiber in between, for imaging an image corresponding to a surface shape of the fiber impregnated with resin; and a traveling device for traveling the fiber impregnated with resin in a non-contacting manner between the light projecting element and the light receiving element; wherein the amount of resin impregnated in the fiber is consecutively measured by imaging the image corresponding to the surface shape while traveling the fiber with the traveling device.

Another resin impregnated amount measuring device of the present invention includes a light projecting element for irradiating a resin impregnating surface of the fiber with light; a light receiving element for receiving light reflected by the resin impregnating surface; and a traveling device for traveling the fiber impregnated with resin; wherein the resin impregnating surface of the fiber is irradiated with light from the light projecting element and the reflected light is received by the light receiving element while traveling the fiber with the traveling device; and the amount of resin impregnated in the fiber is measured from a reflectivity based on the light received amount detected by the light receiving element.

In the resin impregnated amount measuring method and device according to the present invention, an electrostatic capacitance of a fiber impregnated with resin is measured, and an amount of resin impregnated in the fiber is measured based on the measurement result. That is, since the electrostatic capacitance measured in the electrostatic capacitance sensor changes by the type and the volume of the substance positioned between a pair of conductors, the impregnated amount of resin with respect to the fiber is measured using such property. Specifically, various fibers having different resin impregnated amounts are first prepared after specifying the fiber and the material of the resin, and the electrostatic capacitance in a case where each fiber is arranged between the conductors is measured to make a database. The resin impregnated amount with respect to the fiber is measured by checking the measurement result of the sensor in a case where the resin impregnated fiber is actually traveled with the database.

In the present invention, the resin content is measured based on the electrostatic capacitance, which is a physicality value that greatly changes according to the content of resin, and thus the resin content can be accurately measured compared to a case where the load measuring instrument is used as in Japanese Laid-Open Patent Publication No. 2004-209923. In other words, in the conventional mode of Japanese Laid-Open Patent Publication No. 2004-209923, the resin content is difficult to accurately measure since it is measured based on a slight fluctuation degree of weight of 0.5 g per one meter, whereas in the present invention, the resin content can be more accurately measured since the change in the physicality value of the fiber when passing through the electrostatic capacitance sensor of a few centimeters length is acquired. An accurate feedback control is then performed on the resin impregnating unit so that the resin impregnated amount can be accurately maintained within a predetermined range, which contributes to enhancing the quality of the filament winding molded article.

If the resin impregnated fiber does not contact the electrostatic capacitance sensor, there is no possibility that the resin will be transferred to the measuring unit, and the fiber can be supplied to the winding unit without variation in the resin content. Furthermore, the manufacturing line does not need to be stopped for measurement, and response to higher speed of the filament winding molding can be facilitated since the resin impregnated amount can be successively measured while traveling the fiber. Furthermore, the measuring device can have a small size and can be easily attached afterwards to the existing filament winding device.

According to the method and the device of measuring the amount of resin impregnated in the fiber by photoelectrically measuring the thickness of the fiber, the resin impregnated amount can be measured in a non-contacting manner with respect to the resin impregnated fiber, similar to the electrostatic capacitance type. Therefore, there is no possibility that the resin will be transferred to the measuring unit, and the fiber can be supplied to the winding unit without variation in the resin content. Furthermore, the manufacturing line does not need to be stopped for measurement, and response to higher speed of the filament winding molding can be facilitated since the resin impregnated amount can be successively measured while traveling the fiber. Furthermore, the measuring device can have a small size and can be easily attached afterwards to the existing filament winding device. Moreover, it is superior in that the resin content can be accurately measured since a change in the thickness of the fiber in a case of passing between the light projecting element and the light receiving element arranged in the width direction of the fiber can be acquired.

According to the method and the device of irradiating the resin impregnating surface of the fiber with light and measuring the amount of resin impregnated in the resin based on the reflectivity, the resin impregnated amount can be measured in a non-contacting manner with respect to the resin impregnated fiber, similar to the electrostatic capacitance type. Therefore, there is no possibility that the resin will be transferred to the measuring unit, and the fiber can be supplied to the winding unit without variation in the resin content. Furthermore, the manufacturing line does not need to be stopped for measurement, and response to higher speed of the filament winding molding can be facilitated since the resin impregnated amount can be successively measured while traveling the fiber. Furthermore, the measuring device can have a small size and can be easily attached afterwards to the existing filament winding device. Moreover, it is superior in that the resin content can be accurately measured since change in reflectivity of the resin containing fiber in a case of passing through an irradiated position from the light projecting element can be acquired.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

First Embodiment

Figure 1:
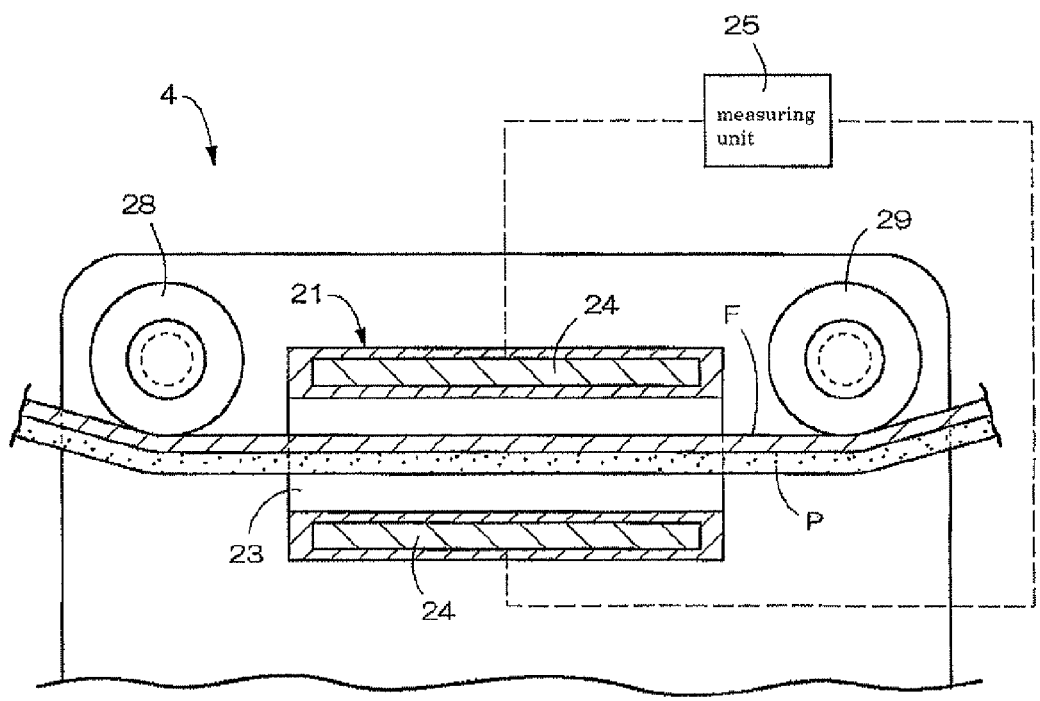
FIG. 1 is a configuration view of a resin impregnated amount measuring device according to a first embodiment of the present invention.
Figure 2:
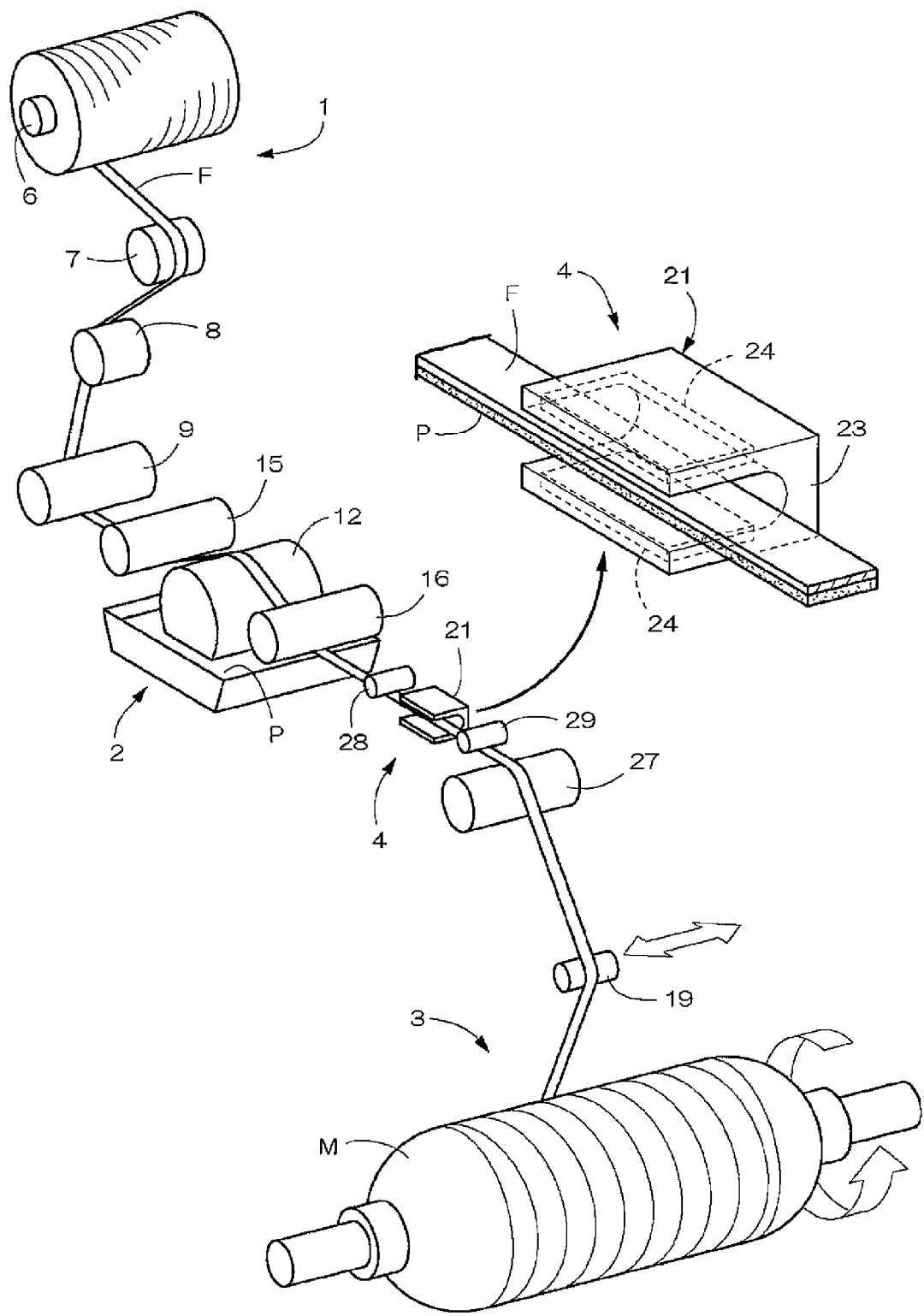
FIG. 2 is a perspective view of an FW molding according to the first embodiment.
Figure 3:
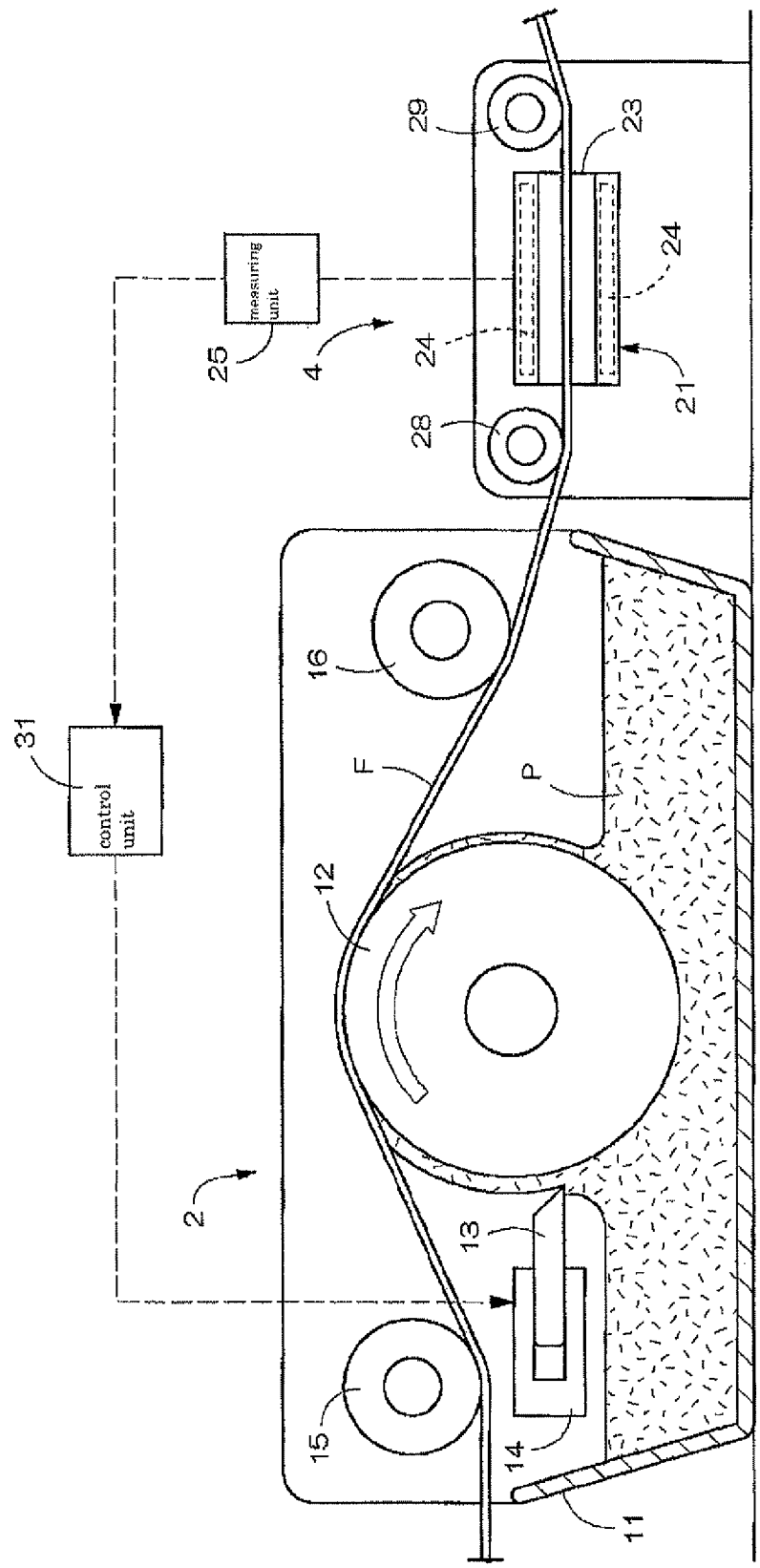
FIG. 3 is a configuration view of the resin impregnated amount measuring device and a resin impregnating unit according to the first embodiment.

FIGS. 1-3 show a first embodiment of the invention in which a resin impregnated amount measuring method and device according to the present invention are applied to a filament winding (FW) apparatus that winds a fiber F to a mandrel (member to be wound) M. As shown in FIG. 2, the FW apparatus is configured by a supply unit 1 of carbon fiber F, a resin impregnating unit 2 that impregnates resin P in the fiber F, a winding unit 3 that winds the fiber F impregnated with resin P to the mandrel M, and the like. A measuring device 4 of the amount of resin impregnated in the fiber F is arranged between the resin impregnating unit 2 and the winding unit 3, and the measurement result is fed back to the resin impregnating unit 2.

The supply unit 1 of the fiber F includes a bobbin 6 around which the fiber F is wound, and an unwinding device 7 that unwinds the fiber F from the bobbin 6. The unwound fiber F is applied with a predetermined tension by a tension device 8, and then supplied to the resin impregnating unit 2 through a drive roller 9 that travels the fiber F. The fiber F is in a tape form having flat surfaces on the upper and lower sides.

As shown in FIG. 3, the resin impregnating unit 2 includes a resin bath 11 that stores the resin P, a rotation roller 12 arranged with the lower part immersed in the resin P in the resin bath 11, and a knife edge 13 that adjusts the amount of resin P adhered to a surface of the rotation roller 12. The knife edge 13 is arranged in a case 14 with a slight clearance with respect to the surface of the rotation roller 12, where the amount of resin P adhered to the surface of the rotation roller 12 can be adjusted by changing the size of the clearance. The resin P adhered to the surface of the rotation roller 12 can be adhered to a lower surface of the fiber F that contacts the upper part of the rotation roller 12 by rotating the rotation roller 12 at a speed corresponding to a supply speed of the fiber F. Rollers 15, 16 on both sides of the rotation roller 12 in a supplying direction of the fiber F contact an upper surface of the fiber F, and maintain a contacting pressure of the fiber F with respect to the rotation roller 12 to a constant.

As shown in FIG. 2, the winding unit 3 includes a traverse device 19 that traverses the fiber F, and the fiber F adhered with resin P through the resin impregnating unit 2 is wound around the mandrel M while being traversed by the traverse device 19.

The resin amount measuring device 4 according to the present embodiment includes an electrostatic capacitance sensor 21 and a traveling device that travels the fiber F. As shown in FIG. 1, the electrostatic capacitance sensor 21 is configured by a base body 23 having a U-shaped cross section in a laid state, and conductive parallel flat plates 24, 24 embedded in upper and lower plates of the base body 23. Reference numeral 25 in FIGS. 1 and 3 indicates a measuring unit that measures the electrostatic capacitance between the upper and lower parallel flat plates 24, 24. The parallel flat plates 24, 24 do not necessarily need to be embedded, and may be exposed to an internal space of the base body 23.

The traveling device of the fiber F is configured by the drive roller 9 arranged between the supply unit 1 and the resin impregnating unit 2, and a drive roller 27 arranged on a downstream side of the electrostatic capacitance sensor 21 in the supplying direction of the fiber F, as shown in FIG. 2. Rollers 28, 29 on both sides of the electrostatic capacitance sensor 21 in the supplying direction of the fiber F contact the upper surface of the fiber F to travel the fiber F in a non-contacting manner and in parallel to the parallel flat plates 24, 24.

The electrostatic capacitance between the parallel flat plates 24, 24 changes according to the type and the volume of the substance positioned the space between the parallel flat plates 24, 24. Therefore, the amount of resin P impregnated in the fiber F traveling through the space can be measured using this property. That is, the measuring unit 25 of the electrostatic capacitance sensor 21 continuously measures the electrostatic capacitance while the fiber F is traveling through the space between the parallel flat plates 24, 24, and measures the amount of resin P impregnated in the fiber F based on the measurement result. Specifically, the measuring unit 25 is recorded with a database storing the measurement results of the electrostatic capacitance at the time when various fibers F having different impregnated amounts of resin P are positioned in the space between the parallel flat plates 24, 24, and the measuring unit 25 measures the amount of resin P impregnated in the fiber F by comparing the obtained measurement value of the electrostatic capacitance with the results stored in the database. The impregnated amount of the measured resin P can be successively displayed on a display unit.

The measurement result of the resin impregnated amount obtained by the measuring unit 25 is transmitted to a control unit 31, as shown in FIG. 3. The control unit 31 is recorded with an optimum value of the impregnated amount of resin P with respect to the fiber F, and upper and lower limit values of a predetermined permissible range. The control unit 31 performs feedback control by moving a tip of the knife edge 13 in a direction away from the surface of the rotation roller 12, that is, in a direction of increasing the clearance in order to increase the adhesion amount of resin P in the resin impregnating unit 2 if the impregnated amount of resin P is smaller than the optimum value. If the impregnated amount is larger than the optimum value, the control unit 31 performs feedback control by moving the tip of the knife edge 13 closer to the surface of the rotation roller 12, that is, in a direction of decreasing the clearance to reduce to the adhesion amount of resin P in the resin impregnating unit 2. The control unit 31 stops the supply of the fiber F if the impregnated amount of resin P is outside the permissible range.

Therefore, in the resin amount measuring device 4 according to the present embodiment, the resin content is measured based on the electrostatic capacitance, which is a physicality value that greatly changes according to the content of resin P, and thus, the resin impregnated amount is more accurately measured as compared to a case where a load measuring instrument is used, such as in Japanese Laid-Open Patent Publication No. 2004-209923. Accurate feedback control is performed on the resin impregnating unit to accurately maintain the resin impregnated amount within a predetermined range, which contributes to enhancement of quality of the FW molded article.

Since the resin content is measured in a non-contacting manner, there is no possibility that the resin P will be transferred to the measuring device 4, and the fiber F can be supplied to the winding unit 3 without variation in the resin content. Furthermore, the manufacturing line does not need to be stopped for measurement, and response to higher speed of the FW molding is facilitated since the resin impregnated amount can be successively measured while traveling the fiber F. Furthermore, the measuring device 4 can have a small size and can be easily attached afterwards to the existing FW device.

Second Embodiment

Figure 4:
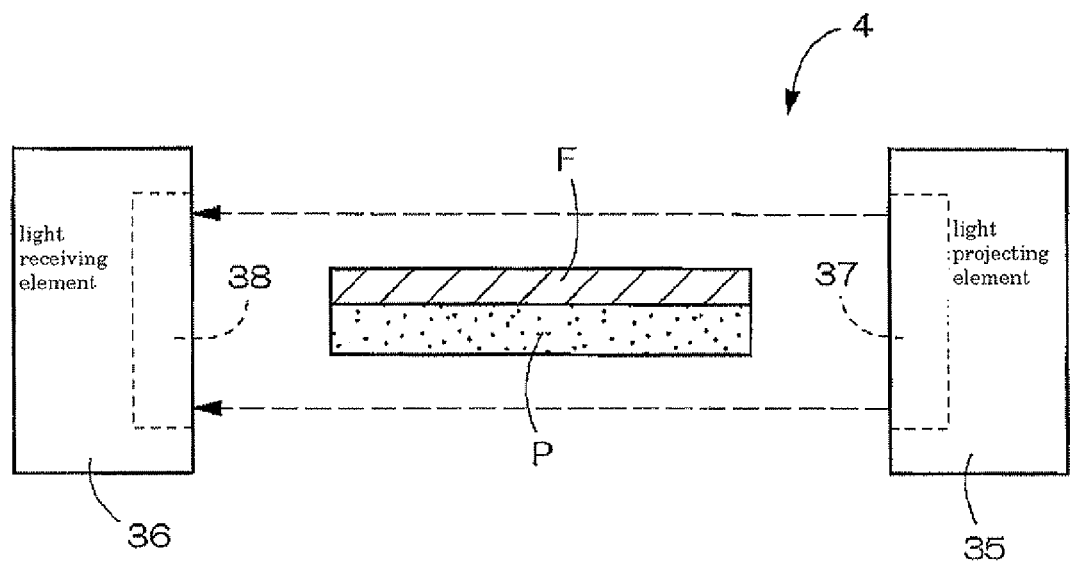
FIG. 4 is a configuration view of a resin impregnated amount measuring device according to a second embodiment of the present invention.
Figure 5:
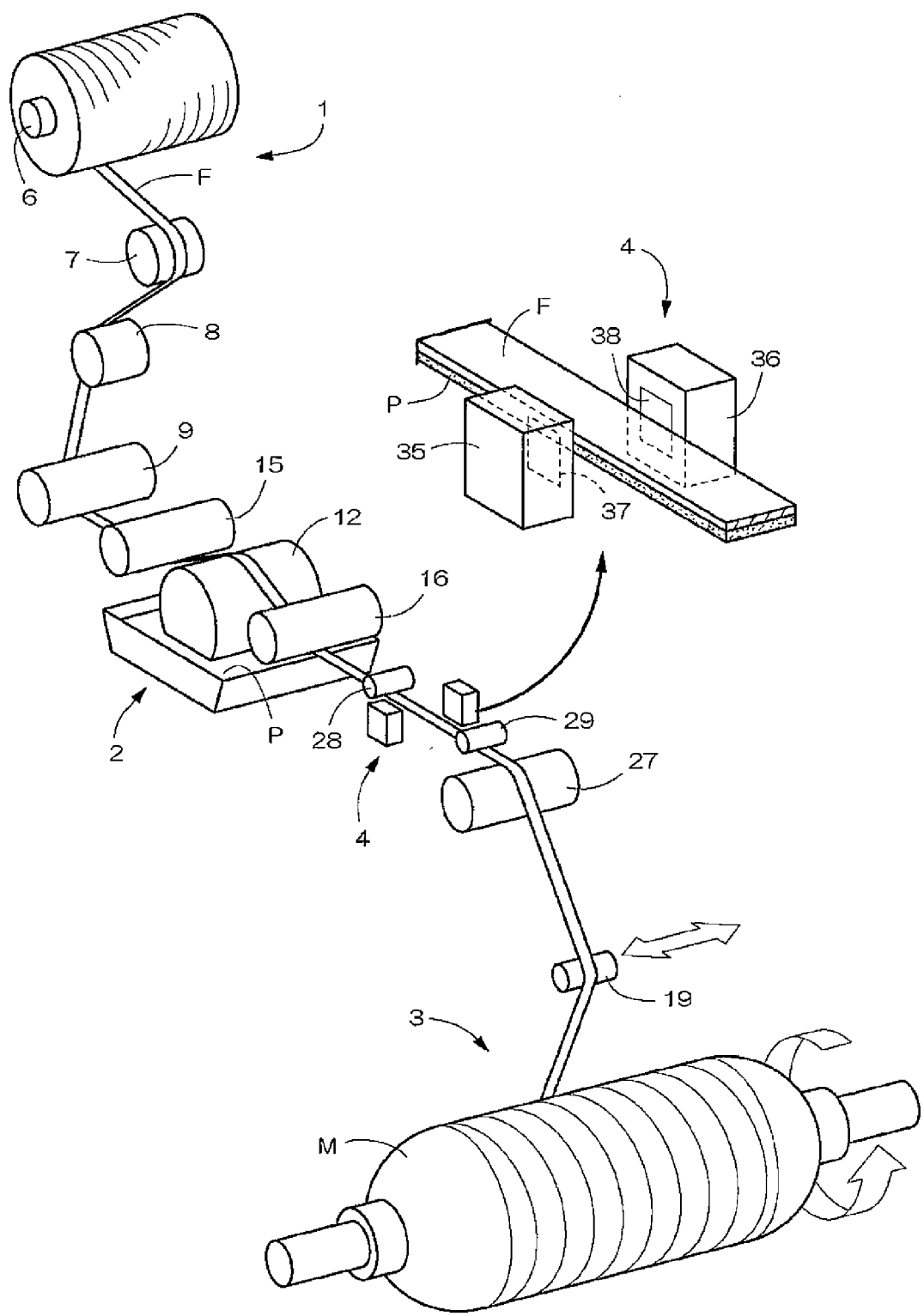
FIG. 5 is a perspective view of an FW molding according to the second embodiment.
Figure 6:
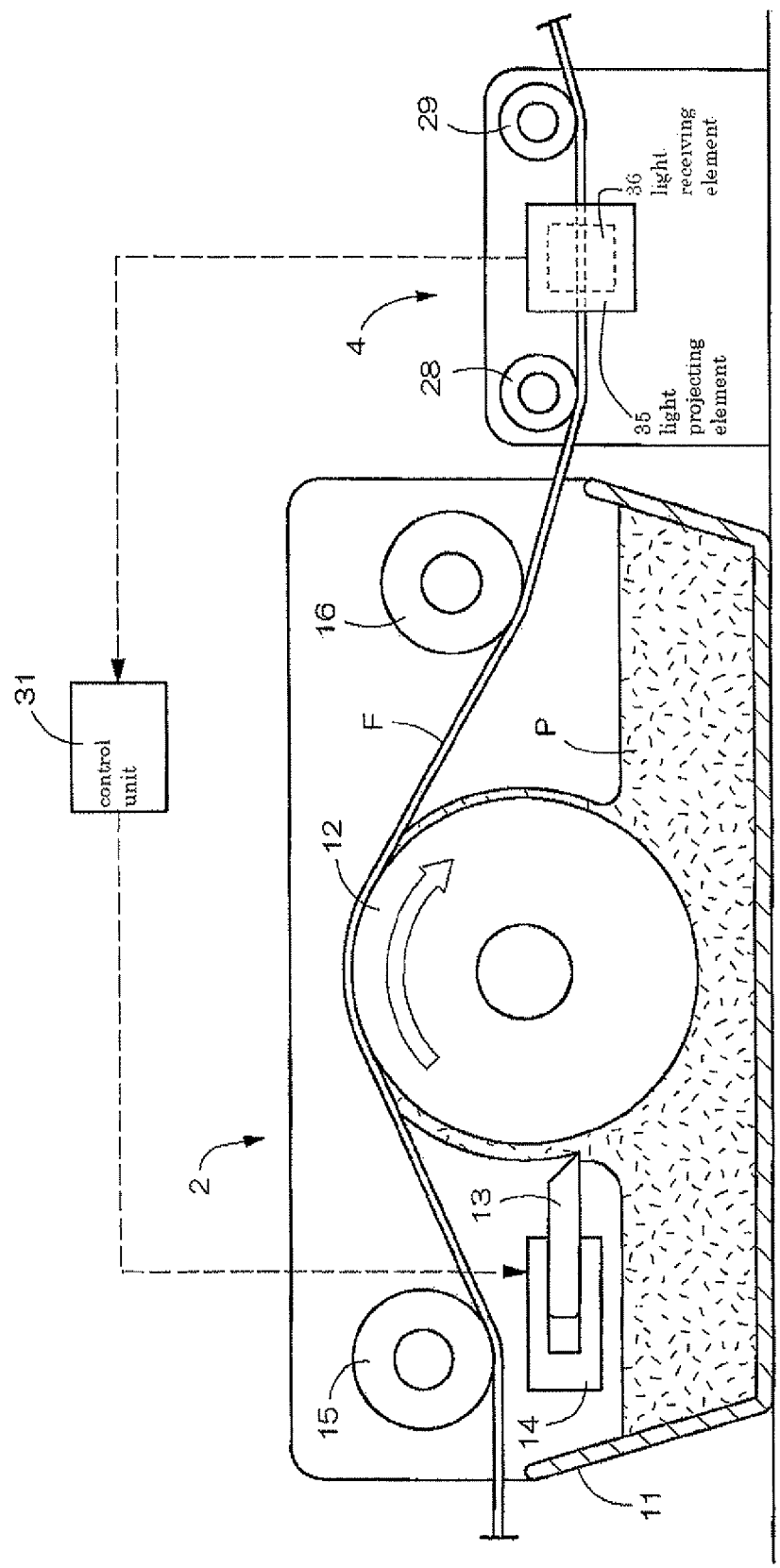
FIG. 6 is a configuration view of the resin impregnated amount measuring device and a resin impregnating unit according to the second embodiment.

FIGS. 4 to 6 show a second embodiment in which a resin impregnated amount measuring method and device according to the present invention are applied to a filament winding (FW) apparatus that winds a fiber F to a mandrel (member to be wound) M. As shown in FIG. 5, the FW apparatus is configured by the supply unit 1 of a carbon fiber F, the resin impregnating unit 2 that impregnates resin P to the fiber F, the winding unit 3 that winds the fiber F impregnated with resin P to the mandrel M, and the like. The measuring device 4 of the amount of resin impregnated in the fiber F is arranged between the resin impregnating unit 2 and the winding unit 3, and the measurement result is fed back to the resin impregnating unit 2.

The supply unit 1 of the fiber F includes the bobbin 6 around which the fiber F is wound, and the unwinding device 7 that unwinds the fiber F from the bobbin 6. The unwound fiber F is applied with a predetermined tension by the tension device 8, and then supplied to the resin impregnating unit 2 through the drive roller 9 that travels the fiber F. The fiber F is in a tape form having flat surfaces on the upper and lower sides.

As shown in FIG. 6, the resin impregnating unit 2 includes the resin bath 11 that stores the resin P, the rotation roller 12 arranged with the lower part immersed in the resin P in the resin bath 11, and the knife edge 13 that adjusts the amount of resin P adhered to the surface of the rotation roller 12. The knife edge 13 is arranged in a case 14 with a slight clearance with respect to the surface of the rotation roller 12, where the amount of resin P adhered to the surface of the rotation roller 12 can be adjusted by changing the size of the clearance. The resin P adhered to the surface of the rotation roller 12 can be adhered to the lower surface of the fiber F that contacts an upper part of the rotation roller 12 by rotating the rotation roller 12 at a speed corresponding to a supply speed of the fiber F. The rollers 15, 16 on both sides of the rotation roller 12 in the supplying direction of the fiber F contact the upper surface of the fiber F, and maintain a contacting pressure of the fiber F with respect to the rotation roller 12 constant.

As shown in FIG. 5, the winding unit 3 includes the traverse device 19 that traverses the fiber F, and the fiber F adhered with resin P through the resin impregnating unit 2 is wound around the mandrel M while being traversed by the traverse device 19.

As shown in FIGS. 4 and 5, the resin amount measuring device 4 according to the present embodiment includes a light projecting element 35 that irradiates the fiber F impregnated with resin P with light from a width direction of the fiber F, a light receiving element 36 as a CCD image sensor arranged at a position opposing the light projecting element 35 with the fiber F in between, and a traveling device that travels the fiber F. The light projecting element 35 and the light receiving element 36 respectively include a light projecting surface 37 and a light receiving surface 38 facing each other. The up and down dimensions of the surfaces 37, 38 are set sufficiently larger than the fiber F impregnated with resin P. While the fiber F travels through the space between the light projecting surface 37 and the light receiving surface 38, the fiber F is continuously or intermittently irradiated with light from the light projecting surface 37, and imaging is continuously or intermittently performed according to the projected light from the light projecting element 35 in the light receiving element 36.

The traveling device of the fiber F is configured by the drive roller 9 arranged between the supply unit 1 and the resin impregnating unit 2, and the drive roller 27 arranged on a downstream side of the light projecting element 35 and the light receiving element 36 in the supplying direction of the fiber F, as shown in FIG. 5. The rollers 28, 29 contact the upper surface of the fiber F to travel the fiber F in a non-contacting manner to the light projecting element 35 and the light receiving element 36 and perpendicular to the light projecting surface 37 and the light receiving surface 38.

Some of the irradiated light from the light projecting surface 37 is shielded by the fiber F impregnated with resin P before reaching the light receiving surface 38. Thus, an image of a shape in which one part is removed from the light projecting surface 37 is obtained in the light receiving element 36. The area of the image changes by the up and down thickness dimension of the fiber F impregnated with resin P. Suppose that the thickness of the fiber of the layer of the resin P and the fiber F is the same, the area of the image formed on the light receiving surface 38 changes by a thickness of the layer of the resin P, that is, by the impregnated amount of resin P with respect to the fiber F. In the present embodiment, the thickness of the fiber F impregnated with resin P is measured based on the area of the image imaged by the light receiving element 36, and the impregnated amount of resin P with respect to the fiber F is measured from the measurement result. The impregnated amount of the measured resin P can be displayed on a display unit.

The measurement result of the obtained resin impregnated amount is transmitted to the control unit 31 shown in FIG. 6. The control unit 31 is recorded with an optimum value of the impregnated amount of resin P with respect to the fiber F, and upper and lower limit values of a predetermined permissible range. The control unit 31 performs feedback control by moving the tip of the knife edge 13 in a direction away from the surface of the rotation roller 12, that is, in a direction of increasing the clearance to increase the adhesion amount of resin P in the resin impregnating unit 2 if the impregnated amount of resin P is smaller than the optimum value. If the impregnated amount is larger than the optimum value, the control unit 31 performs feedback control by moving the tip of the knife edge 13 closer to the surface of the rotation roller 12, that is, in a direction of decreasing the clearance to reduce to the adhesion amount of resin P in the resin impregnating unit 2. The control unit 31 stops the supply of the fiber F if the impregnated amount of resin P is outside the permissible range.

Third Embodiment

Figure 7:
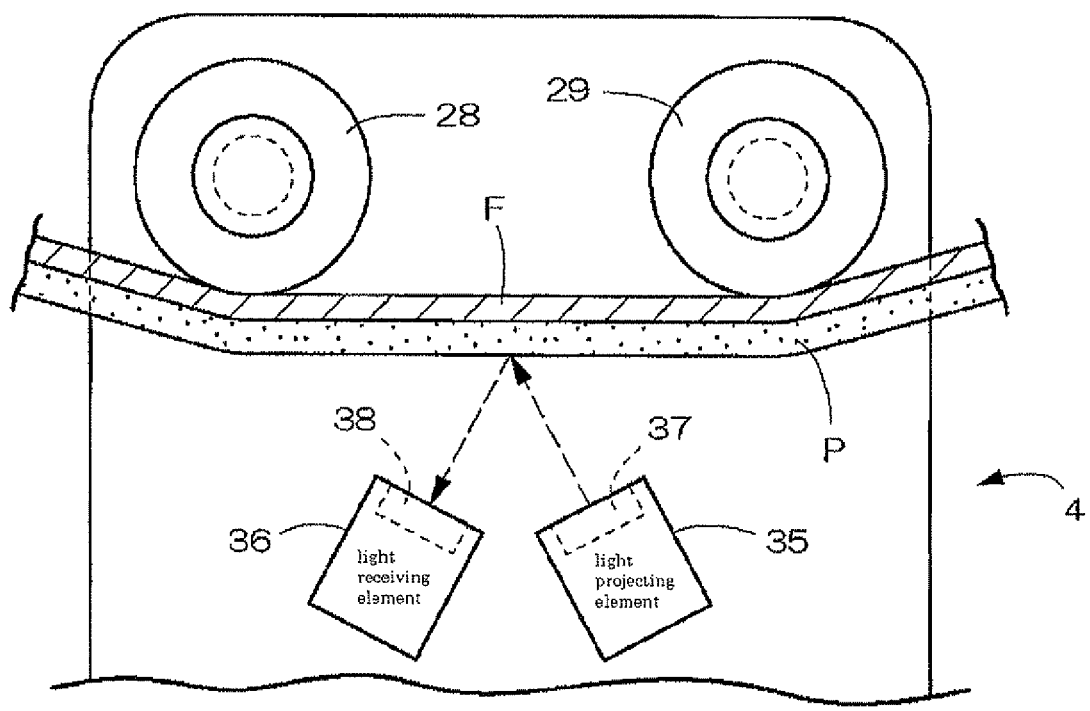
FIG. 7 is a configuration view of a resin impregnated amount measuring device according to a third embodiment of the present invention.

FIG. 7 shows a third embodiment of a resin impregnated amount measuring method and device according to the present invention. Here, the impregnated amount of resin with respect to the fiber F is measured using the property that the reflectivity in a case where a resin impregnating surface of the fiber F is irradiated with light changes by the impregnated amount of resin P. Specifically, the light projecting element 35 and the light receiving element 36 are arranged on a lower side of a traveling path of the fiber F, the lower surface (resin impregnating surface) of the fiber F is irradiated with light diagonally upward from the light projecting element 35, and the reflected light is received by the light receiving element 36. The reflectivity at the resin impregnating surface is obtained from the ratio of the light projected amount from the light projecting element 35 to the light received amount by the light receiving element 36, and the amount of resin impregnated in the fiber F is measured based on the reflectivity. Other aspects are similar to the second embodiment, and thus same reference numerals are denoted for the same members and the description thereof is omitted.

Fourth Embodiment

Figure 8:
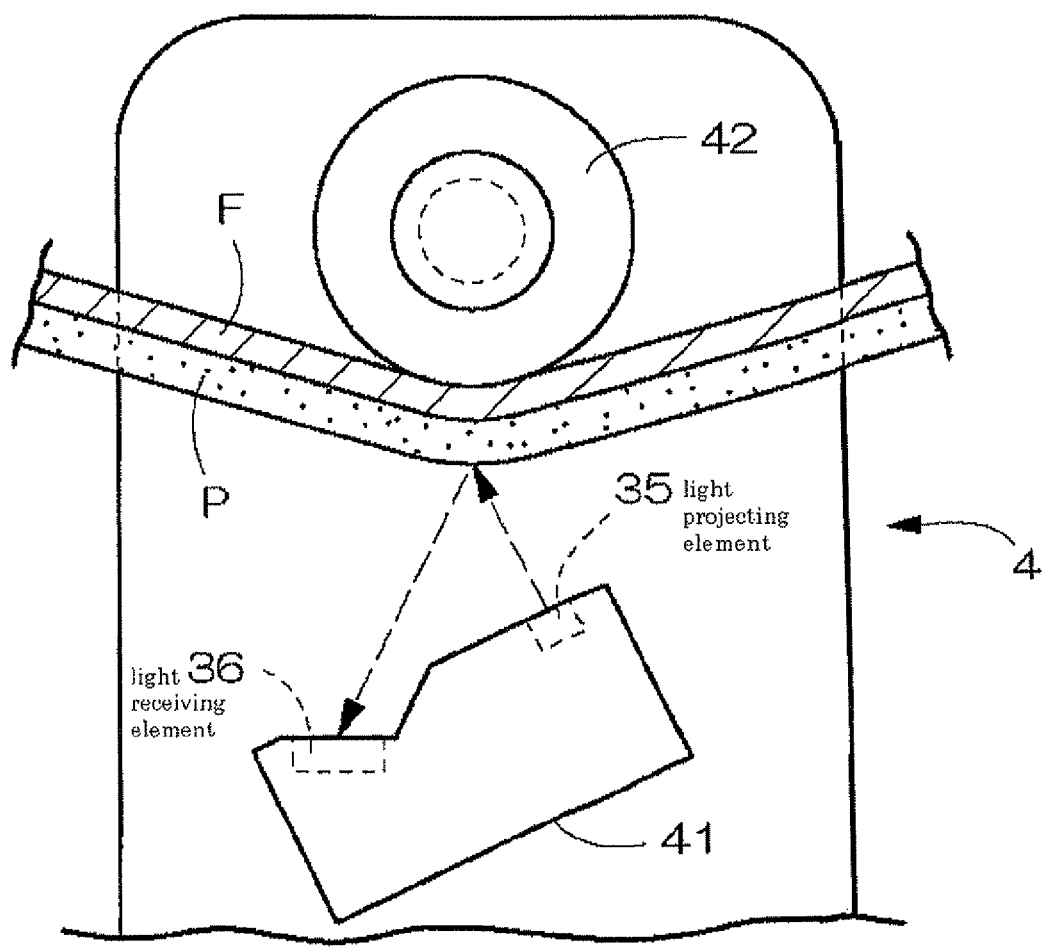
FIG. 8 is a configuration view of a resin impregnated amount measuring device according to a fourth embodiment of the present invention.

FIG. 8 shows a fourth embodiment of a resin impregnated amount measuring method and device according to the present invention. Here, focusing on the fact that the distance from a certain point to the resin impregnating surface changes by the thickness of the layer of resin P, that is, by the impregnated amount of resin P with respect to the fiber F, the impregnated amount of resin P is measured based on the measurement result of the distance. Specifically, a laser light unit 41 including the light projecting element 35 of a laser light and the light receiving element 36 is arranged on the lower side of a traveling path of the fiber F, and the lower surface (resin impregnating surface) of the fiber F is irradiated with laser light diagonally upward from the light projecting element 35. The distance from the light projecting element 35 to the resin impregnating surface is measured based on a light received position of the light receiving element 36 of the laser light reflected by the resin impregnating surface, and the amount of resin is measured based on the measured distance. A roller 42 arranged on an upper side of a laser light irradiated portion of the resin impregnating surface contacts the upper surface of the fiber F, and maintains the traveling position of the fiber F with respect to the laser light unit 41 constant. Other aspects are similar to the second embodiment, and thus same reference numerals are denoted for the same members and the description thereof is omitted.

According to the resin amount measuring device 4 of the second to the fourth embodiments, the resin content can be measured in a non-contacting manner with respect to the fiber F impregnated with resin P, and thus there is no possibility that the resin P will be transferred to the measuring device 4, and the fiber F can be supplied to the winding unit 3 without variation in the resin content. Furthermore, the manufacturing line does not need to be stopped for measurement, and response to higher speed of the FW molding is facilitated since the resin impregnated amount can be successively measured while traveling the resin F. Furthermore, the measuring device 4 can be made smaller and can be easily attached afterwards to the existing FW device. Moreover, the change in thickness or reflectivity of the fiber F, or the change in the distance from the light projecting element 35 to the resin impregnating surface may be obtained, and the resin content may be measured based thereon, and thus a significantly accurate measurement compared to the conventional art can be realized.

While the present invention has been described with respect to embodiments thereof, the invention may be modified in numerous ways and may assume many embodiments other than those specifically set out and described above. Accordingly, the appended claims cover all modifications that fall within the true spirit and scope of the present invention.

What is claimed is:

1. A resin impregnated amount measuring method in a filament winding molding comprising:
    unwinding a fiber from a bobbin;
    impregnating the fiber with a resin using a resin impregnating unit that includes a resin bath, a rotation roller arranged with the lower part immersed in the resin in the resin bath, and a knife edge that adjusts the amount of resin adhered to a surface of the rotation roller; wherein the knife edge is arranged in a case with a slight clearance with respect to the surface of the rotation roller, where the amount of resin adhered to the surface of the rotation roller can be adjusted by changing the size of the clearance;
    passing the fiber through an electrostatic capacitance measuring device;
    measuring an electrostatic capacitance of the fiber impregnated with resin;
    measuring an amount of resin impregnated in the fiber based on a capacitance measurement result; and
    winding the fiber impregnated with resin on a mandrel.

2. The resin impregnated amount measuring method according to claim 1, wherein the amount of resin impregnated in the fiber is successively measured by traveling the fiber impregnated with resin in a non-contacting manner between two parallel flat plates of an electrostatic capacitance sensor and measuring a change in an electrostatic capacitance.

3. The resin impregnated amount measuring method according to claim 2, further comprising performing feedback control of the amount of resin impregnated in the fiber by comparing the measured amount of impregnated resin with an optimum value.

4. A resin impregnated amount measuring device for measuring an amount of resin impregnated in a fiber in a filament winding molding; the resin impregnated amount measuring device comprising:
    a bobbin from which the fiber is unwound;
    a resin impregnating unit includes a resin bath, a rotation roller arranged with the lower part immersed in the resin in the resin bath, and a knife edge that adjusts the amount of resin adhered to a surface of the rotation roller; wherein the knife edge is arranged in a case with a slight clearance with respect to the surface of the rotation roller, where the amount of resin adhered to the surface of the rotation roller can be adjusted by changing the size of the clearance;
    an electrostatic capacitance sensor having two parallel flat plates;
    a traveling device for traveling the fiber impregnated with resin in a non-contacting manner between the two parallel flat plates; wherein the amount of resin impregnated in the fiber is successively measured while traveling the fiber with the traveling device; and
    a mandrel on which the fiber impregnated with resin is wound.

* * * * *